US008924857B2

(12) United States Patent
Landwehr, Jr.

(10) Patent No.: US 8,924,857 B2
(45) Date of Patent: Dec. 30, 2014

(54) MULTI-DIMENSIONAL RIGHTS SCHEME

(75) Inventor: John Thomas Landwehr, Jr., San Mateo, CA (US)

(73) Assignee: Adobe Systems Incorporated, San Jose, CA (US)

( * ) Notice: Subject to any disclaimer, the term of this patent is extended or adjusted under 35 U.S.C. 154(b) by 2146 days.

(21) Appl. No.: 11/507,803

(22) Filed: Aug. 21, 2006

(65) Prior Publication Data

US 2014/0304823 A1    Oct. 9, 2014

(51) Int. Cl.
*G06F 3/00* (2006.01)
*H04L 29/06* (2006.01)
*G06F 21/10* (2013.01)

(52) U.S. Cl.
CPC ............... *H04L 63/10* (2013.01); *G06F 21/10* (2013.01)
USPC .......................................... 715/741; 715/202

(58) Field of Classification Search
CPC ....................................................... G06F 21/10
USPC .......................................... 715/202, 741, 200
See application file for complete search history.

(56) References Cited

U.S. PATENT DOCUMENTS

| | | | | |
|---|---|---|---|---|
| 7,155,415 B2 * | 12/2006 | Russell et al. | ................. | 705/59 |
| 7,249,264 B2 * | 7/2007 | Belknap et al. | ............... | 713/189 |
| 7,581,255 B2 * | 8/2009 | Alkove et al. | ................. | 726/26 |
| 7,617,542 B2 * | 11/2009 | Vataja | ............................. | 726/30 |
| 8,185,959 B2 * | 5/2012 | Bellwood et al. | ............... | 726/26 |
| 8,321,690 B2 * | 11/2012 | Oliveira et al. | ............... | 713/193 |
| 8,387,150 B2 * | 2/2013 | Schnell | ........................... | 726/26 |
| 2004/0088557 A1 * | 5/2004 | Malcolm et al. | ............. | 713/193 |
| 2004/0196972 A1 * | 10/2004 | Zhu et al. | ........................ | 380/45 |
| 2005/0278716 A1 * | 12/2005 | Koppen et al. | ................ | 717/168 |
| 2011/0167254 A1 * | 7/2011 | Dagdeviren | ................... | 713/150 |

OTHER PUBLICATIONS

V-Chip: Viewing Television Responsibly, <http://www.fcc.gov/vchip/> (visited Oct. 6, 2006).
Evangelista, Benny, *New DVD player lets parents clean up movies Hollywood is unhappy, but viewers may like ability to filter out sex and violence*, Apr. 12, 2004, <http://www.sfgate.com/cgi-bin/article.cgi?file=/chronicle/archive/2004/04/12/BUG2H63CEH1.DTL> (visited Oct. 6, 2006).
*Clean Films*, Aug. 19, 2004, <http://www.familyfirst.com/clean_films.html> (visited Oct. 6, 2006).
*Watch Edited Movies With These Edited Movies DVD Players*, <http://familysafemedia.com/edited_movies_-_parental_contr.html> (visited Oct. 6, 2006).

* cited by examiner

*Primary Examiner* — Manglesh M Patel
(74) *Attorney, Agent, or Firm* — Kilpatrick Townsend & Stockton LLP (57) ABSTRACT

A multi-dimensional rights scheme is described, including generating a time-based media presentation including a media track, encoding the media track for a first right of a user of the media presentation, and encoding a time-based portion of the media presentation for a second right of the user of the media presentation.

24 Claims, 6 Drawing Sheets

MULTI-DIMENSIONAL RIGHTS SCHEME

FIELD OF THE INVENTION

The present invention relates generally to software. More specifically, a multi-dimensional digital rights scheme is described.

BACKGROUND OF THE INVENTION

A media presentation is a compilation of one or more media elements that may be played back using an appropriate playback device. A media presentation may be, for example, a video having one or more video or audio tracks. A media presentation may further include other types of media such as images and text. A media presentation may be played back on any appropriate device such as a television, a computer system, or a portable device such as a cellular telephone.

Playback devices may have various characteristics. For example, some, such as a large television or computer monitor, may be capable of playing back high-resolution video. Others, such as the small screens of cellular telephones and personal digital assistants, may be unable to playback or store the same high-resolution video that the larger screens are capable of displaying. Likewise, audio playback devices may range from a single, small headphone to multiple-speaker digital surround sound systems.

Media presentations may additionally contain material that may be objectionable to certain audiences (e.g., children). Media presentations may be separately released in multiple versions, for example, an original version and another version edited with the objectionable material removed or substituted. Further, other media presentations may include minor objectionable material that may be easily removed, but is too costly or cumbersome to remove for an individually edited version.

Thus, what is needed is a rights scheme without the limitations of conventional techniques.

BRIEF DESCRIPTION OF THE DRAWINGS

Various embodiments of the invention are disclosed in the following detailed description and the accompanying drawings.

DETAILED DESCRIPTION

Various embodiments may be implemented in numerous ways, including as a system, a process, an apparatus, or a series of program instructions on a computer readable medium such as a computer readable storage medium or a computer network where the program instructions are sent over optical or electronic communication links. In general, operations of disclosed processes may be performed in an arbitrary order, unless otherwise provided in the claims.

A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

According to various embodiments, a multi-dimensional rights scheme allows a single or multiple-file media presentation to be encoded for various rights for both individual media tracks and time-based portions of the media presentation. The individual media tracks and time-based portions may be encoded for rights that may be unlocked using keys. A user may be given a key to grant the right to play a certain media track, time-based portion, or intersection of track and time. The keys may be granted in response to receiving payment from the user, for example. A two-dimensional rights scheme may be implemented using a matrix and encoding media tracks and time-based portions with various keys according to the matrix.

Matrix for Implementing a Multi-Dimensional Rights Scheme

Figure 1:
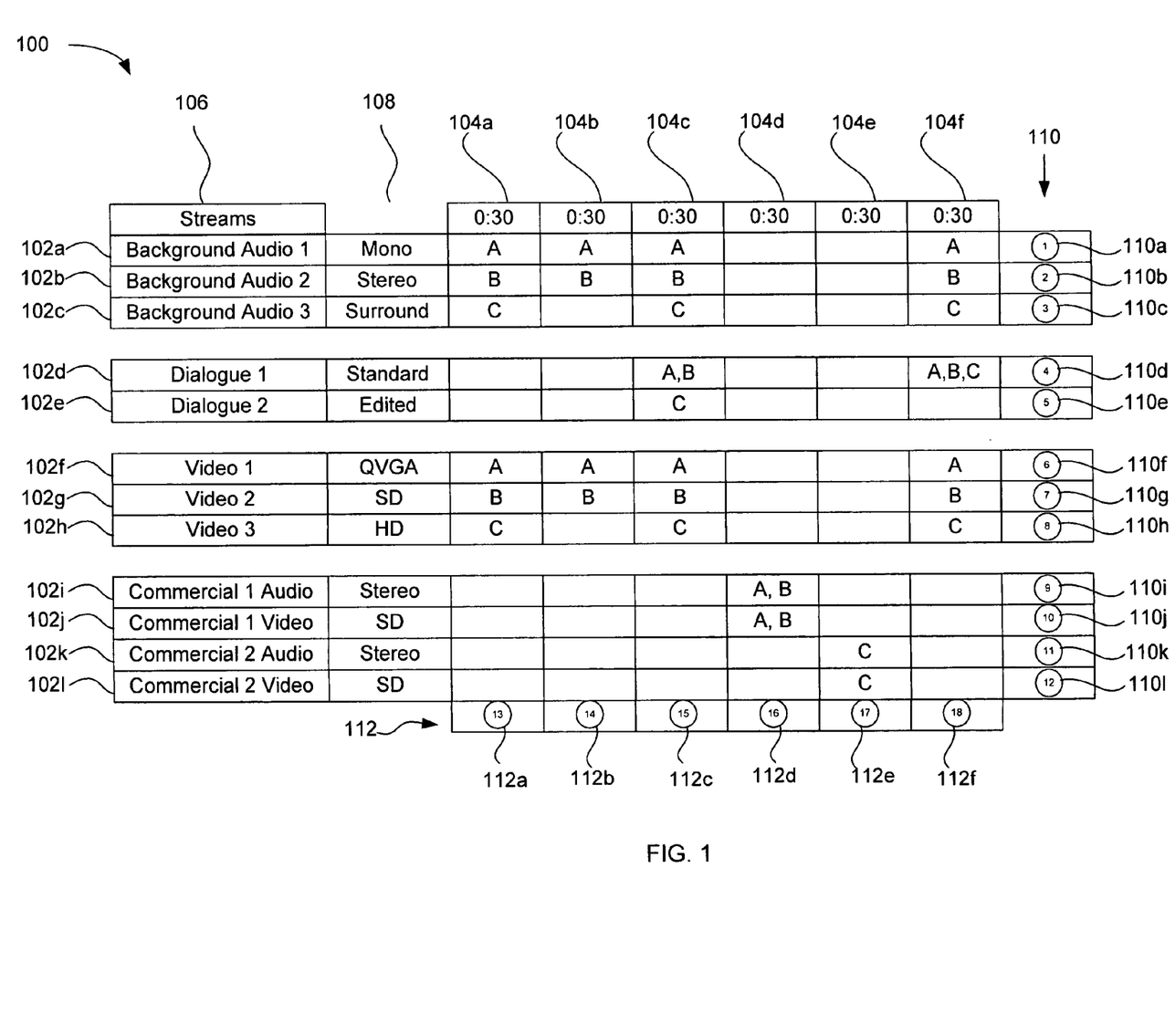
FIG. 1 illustrates a matrix for applying a multi-dimensional rights scheme to a media presentation according to an embodiment.

FIG. 1 illustrates a matrix 100 for applying a multi-dimensional rights scheme to a media presentation according to an embodiment. A media presentation is represented by the matrix 100. One or more media tracks (e.g., video or audio tracks) may be represented in the rows of the matrix 100, while one or more time-based portions (e.g., segments) of the media presentation are represented by the columns of the matrix 100. A cell (i.e., the intersection of a row and column) of the matrix 100 is a time-based portion of a media track.

The matrix 100 may be used, according to various embodiments, in combination with a rights scheme (e.g., using digital rights management (DRM)) to present one or more versions of the media presentation. According to an embodiment, the matrix 100 may be used to implement a two-dimensional rights scheme, which applies various rights (e.g., using DRM) to one or more tracks of a time-based media presentation, as well as to time-based portions of the time-based media presentation. A user may unlock the rights using one or more keys that may be given to the user for various reasons.

According to various embodiments, a single media presentation (e.g., a media presentation distributed using one or more files or other media) may be configured to present multiple distinct versions of the presentation when different keys or combinations of keys are used to play the presentation. For example, a key may be issued to a player (e.g., a television in a child's bedroom) that activates an edited track to lower the rating of the presentation. One version of the media presentation may have a rating suitable for older children, while another, edited version is suitable for younger children. Two keys may be issued: one for the edited version, and one for the unedited version, and depending on which key a user has, a single file or other media may contain and be able to play both versions. Depending on what rights a viewer has and the configuration that the viewer has chosen, certain media tracks or time-based portions of the media presentation may or may not played back.

The media presentation may be a video such as a television program or a feature film. The media presentation may include one or more versions of the audio and video for the video. For example, one audio track may be a monaural track, while another is a stereo track, and a third is a surround sound track. Likewise, several video tracks of varying resolutions may also be included. Based on a user's granted rights to view the media presentation, one or more audio tracks and one or more video tracks may be played together. Further, rights may also be assigned to time-based portions of the various tracks of the media presentation. A user may make a payment to a distributor of the media presentation to automatically skip certain portions (e.g., commercials) of the media presentation. Other types of media presentations, such as audio presentations and slideshows may also be used with various embodiments.

According to various embodiments, a user may have rights to view tracks or time-based portions of a media presentation. A right gives a user the ability to play a track or portion of the media presentation that is encoded for that right. Rights may also allow a user to avoid watching a time-based portion of a media presentation. Rights may be granted by a distributor of a media presentation (e.g., a content author), or by a user of the media presentation. For example, a user may grant different rights based on the abilities of the display on which the user is viewing the media presentation. Rights may be encoded in a media presentation using a DRM or other scheme, and may be unlocked using keys which are distributed to those who have been granted the rights. Any appropriate DRM scheme may be used to encode the media presentation for the rights described herein. For example, the DRM scheme may include some type of encryption unlockable by an individual key for each individual right assigned in the matrix 100.

The rows of the matrix 100 include several media tracks 102a-102l of the media presentation. A media track may include a time-based track such as a video or audio track. The columns of the matrix 100 designate several time-based portions 104a-104f of the media tracks in the rows 102a-102l. Each of the time-based portions 104a-104f represents a predetermined amount of time of the media presentation. For example, the time-based portion 104a is a thirty second portion of the media presentation.

Two columns, a column 106 and a column 108 identify the function and nature of the media tracks 102a-102l. The column 106 generally describes the category to which individual media tracks belong, for example, whether a media track is an audio track, a video track, or a commercial. The column 108 more specifically describes individual tracks in the rows 102a-102l.

For example, the media track 102a is an audio track with monaural sound, the media track 102b is an audio track with stereo sound, and the media track 102c is an audio track with surround sound. The media tracks 102a-102c may include background audio (e.g., music and sound effects). The media track 102d is a dialogue audio track, and the media track 102e is a dialogue track that is edited. The media track 102d may include language that may be inappropriate for younger viewers, and the media track 102e may include an alternative track that has been edited to remove or replace the objectionable material.

Three video tracks 102f-102h may each have different resolutions, for example the media track 102f may have a resolution of 320 pixels by 240 pixels (e.g., a quarter video graphics array (QVGA) resolution), the media track 102g is a standard definition (SD) track, and the media track 102g is a high definition (e.g., 1080 interlaced horizontal lines) video track.

According to an embodiment, the media presentation may include each track 102a-102l in a single package (e.g., a single file, a compact disc, a digital versatile disc (DVD)). One audio and one video track may be designated for use by a specific user or a specific machine. For example, a distributor of the media presentation may grant the user a right to view the low resolution media track 102f and the monaural audio track 102a for free. The distributor may also force the user to watch one or more of the commercial media tracks 102i-102l. The user may submit payment to the distributor to gain rights to the higher resolution or higher fidelity audio tracks, as well as the right to skip the commercial media tracks 102i-102l. According to other embodiments, the distributor may enable a viewer may be able to skip any of the time-based periods 104, for example to avoid an objectionable portion of the media presentation.

The media presentation is divided into several time-based portions 104a-104f. The length of each of the time-based portions 104a-104f may be arbitrarily chosen based on characteristics of the media presentation. For example, the time-based portion 104d may correspond to a commercial break (e.g., on the media tracks 102i-102l). The commercial may last for a predetermined duration, e.g., thirty seconds. A user may be granted a right to skip the commercial in exchange for payment to the distributor. In this case, if the user has an appropriate key indicating that they have made payment to skip the commercial in the time-based portion 104d, the media presentation would continue without viewing the time-based portion 104d when it is encountered.

Keys may be used to demonstrate that a user has a right to view a media track or a time-based portion of a media presentation. A column 110 may include various keys 110a-110l that may be issued to a user to grant the right to view the media tracks 102a-102l, respectively. A key may be, for example, a license file that is distributed to a user, perhaps in exchange for payment or other consideration. For example, a user may view the track 102f if the user possesses the key 110f.

A row 112 includes keys for each of the time-based portions 104a-104f of the media presentation. Keys 112a-112f may be used to view the time based portions 104a-104f, respectively. According to an embodiment, each of the cells of the matrix 100 may be viewed using a combination of keys. For example, the cell at the intersection of the media track 102d and the time-based portion 104c may be viewed if the user has the keys 110d and 112c. Not every media track 102a-102i or time-based portion 104a-104d need be encoded; in some cases fewer than two keys may be used to view a cell of the matrix 100. Additionally, according to another embodiment, each cell (i.e., each intersection of a media track 102 and a time-based portion 104) may have its own key. Rights may then be granted based on the combination of the various tracks along with the time-based portions of the media presentation.

Although the keys 110a-110l and 112a-112f shown here are each different, according to various embodiments, some of the keys 110a-110l and 112a-112l may be the same. In other words, a single key may unlock multiple media tracks and/or time-based portions according to an embodiment.

As another example, the edited media track 102e may contain audio where edits have been made, and the remainder of the media track 102e may be silent. As a result, if a user possesses the key 110e, the user may also possess another key (e.g., the key 110d) to provide audio where the edited media track 102e is silent (e.g., during the time-based portions 104a, 104b, and 104d-104f). During the time-based portion 104c, the play of the media track 102d ceases, and the media track 102e is played. By attaching the key 110e to a first user (e.g., a child who watches a specified viewing device), a second user (e.g., a parent) may determine which content is viewed by the first user. According to an embodiment, either of the dialogue tracks 102d or 102e may be mixed (e.g., played simultaneously) with one of the background tracks 102a-102c. In this way, an appropriate content may be chosen for the viewer. Alternatively, the dialogue and background audio tracks may be combined into a single track. In this embodiment, an edited and an unedited track may be included.

According to an embodiment, two different commercials may be alternatively played on different media tracks 102i-102j and 102k-102l. The commercial of the media tracks 102i-102j may be geared toward a more mature audience (e.g., a car commercial), while the commercial in the media track 102k-102l may be geared toward a younger audience (e.g., a toy commercial). For example, as is explained regarding FIG. 2, certain time-based portions 104 may be shown to certain viewers based on the keys possessed by those viewers. The commercial shown on the tracks 102i and 102j in the time-based portion 104d may be shown to one viewer, and the commercial shown on the tracks 102k and 102l in the time-based portion 104e may be shown to another viewer. Based on the rights given to certain viewers (as granted by the various keys), certain time-based portions may substitute for others. Using the matrix 100, commercials can be aimed at a specific demographic audience as is desired by the distributor of the media presentation. Other types of substitutions may also be used. For example, alternate tracks can be used to provide edited audio tracks, as discussed above.

According to another embodiment, the time-based portions 104 may be played in any order. The order of the time-based portions 104 may be determined by the distributor of the media presentation, or may be determined by the viewer. Additionally, the media presentation may be played back without all of the time-based portions 104. For example, in order to present multiple versions of the media presentation with different ratings, the media presentation may be played back without certain of the time-based portions 104. In order to show a "mature" version of the media presentation, the time-based portions 104a-104c and 104f may be played. A "teenage" version may omit the time-based portion 104f, and a "children's" version may also omit the time-based portion 104b. In this way, a media presentation distributed using a single package (e.g., a single file or disc) may be shown in multiple versions. Additionally, as discussed above, certain edited tracks may be substituted to alter the rating of the presentation.

The commercials shown in the time-based periods 104d and 104e may also be used to prompt a user to upgrade their version of the media presentation. For example, the media presentation may be distributed to the viewer with or without each of the media tracks 102a-102l. The viewer may be watching the media presentation using the monaural background audio track 102a and the low-resolution 320×240 video track 102f. During the commercial shown in the time-based period 104d, the viewer may be prompted to make payment to upgrade their version of the media presentation. The user can make that payment, and then be granted the right to view the surround audio track 102c and the high definition video track 102h by granting the appropriate keys 110c and 110h to the viewer. Rights can be granted in exchange for payments or other consideration collected using various techniques such as a payment interface of a media player playing the presentation (e.g., a "payment" button on a set top box), a website, or using a telephone interface, The viewer may also extract a smaller version of the media presentation. For example, the media presentation may be distributed in a single file including up to all of the media tracks 102a-102l. If the viewer is watching the media presentation on a low-resolution device (e.g., a cellular telephone), the viewer may remove the unwanted media tracks, and transfer the wanted media tracks (e.g., the media tracks 102a, 102d, and 102f) to their device. The media presentation itself or a program to view the media presentation may include functionality to produce various customized versions.

The media presentation may also include functionality to restrict navigation during viewing. For example, when a viewer is watching the commercial shown in the time-based portion 104d, the rights of the viewer may prevent the viewer from navigating (e.g., rewinding or fast-forwarding) during the display of the commercial. This prohibition may also extend to the display of other portions of the media presentation. The user may be granted the right to navigate the media presentation by being granted another key, for example.

System for Implementing a Multi-Dimensional Rights Scheme

Figure 2:
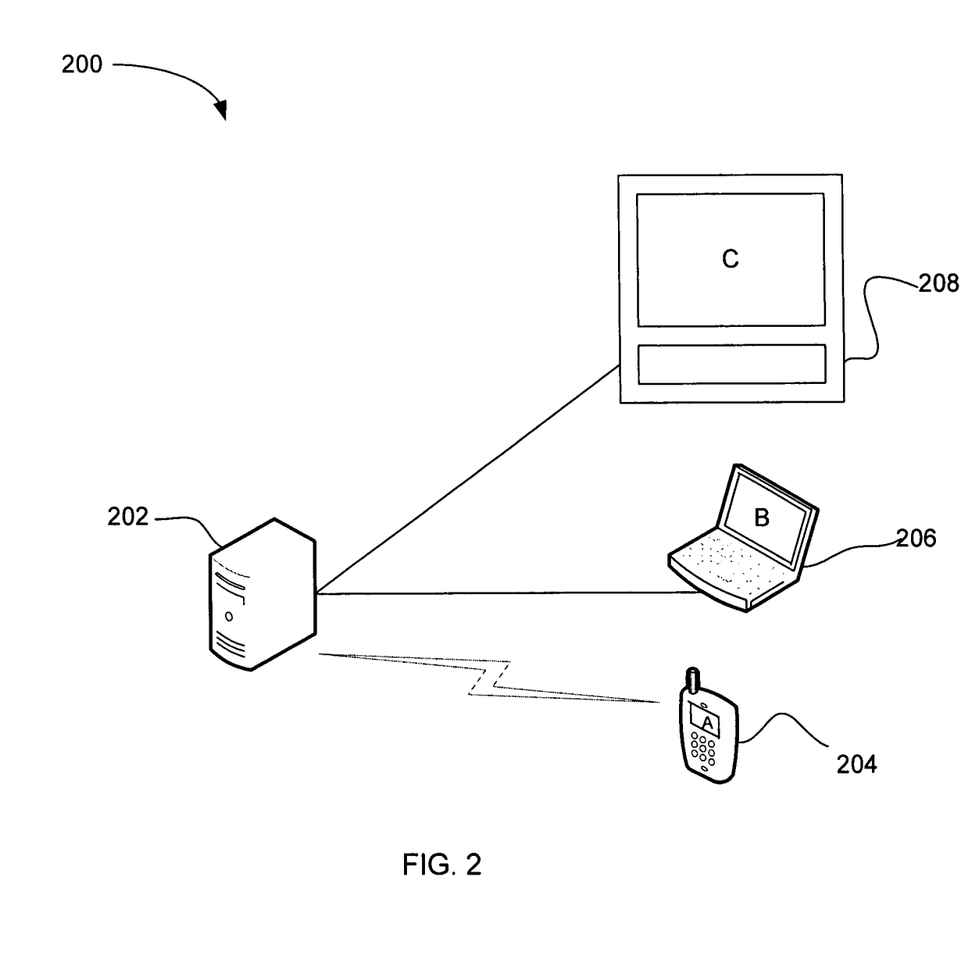
FIG. 2 illustrates a system for playing a media presentation using a multi-dimensional rights scheme according to an embodiment.

FIG. 2 illustrates a system 200 for playing a media presentation using a multi-dimensional rights scheme, according to an embodiment. The media presentation represented by the matrix 100 may include several tracks in a single file that is stored on a server 202, for example. The server may be a computer system in a user's home, for example. As shown in the example here, the server 202 may be connected to three different playback devices (e.g., televisions or personal computers): display A 204, display B 206, and display C 208. The display A 204 may be, for example, a portable device such as a cellular telephone or a personal digital assistant viewed by an adult; the display B 206 may be a small television or personal computer viewed by an adult, and the display C 208 may be a large, high definition television viewed by all members of a family.

The matrix 100 includes several cells which are formed by the intersection of the rows and columns of the matrix 100. In some of these cells, one or more displays are listed. For example, at the cell created by the intersection of the column for the time-based portion 104a and the media track 102a (i.e., the first time-based portion of the media track using monaural sound) is played back by the display A 204. Certain of the time-based portions are not played by each of the displays. For example, the time-based portion 104b may include objectionable material, and therefore would not be played on the display C 208, which is viewed by family members. Further, the display C plays back the media tracks 102c and 102h, which are surround sound and high definition tracks, respectively. The display C 208 also plays a portion of the media track 102e during the time-based portion 104c. The media track 102e is an edited track, and the audio media track 102d may contain objectionable material during the time-based portion 104c. The display C 208 can then play back the edited media track 102e during this period.

Keys (e.g., some of the keys 110a-110l and 112a-112f) may be granted to each of the displays A 204, B 206, and C 208. The keys can be used to determine the desired content to be played on each of the displays. For example, the display C 208 may possess the keys 110f and 110i, but not the keys 110h or 112b. By giving the key 110e to the display C 208, the edited media track 102e is played during the time-based portion 104c, as described above. This scheme can be used to play a desired configuration of the media presentation on a specific display. According to various embodiments, the keys may be stored by the server 202, or by any of the displays 204, 206, or 208.

The system 200 may also illustrate distribution of a media presentation over a wide area network (WAN) or other type of network such as the Internet. For example, the server 202 may be a remote server, and each of the displays 204-208 may be individual systems which have certain rights granted to them using certain keys. The keys may be stored by the server 202 or by the displays 204-208. It is further understood that the multi-dimensional rights scheme described herein may be implemented without a system such as the system 200. For example, the scheme may be implemented individually on each of the displays 204-208.

Timeline of a Media Presentation

Figure 3:
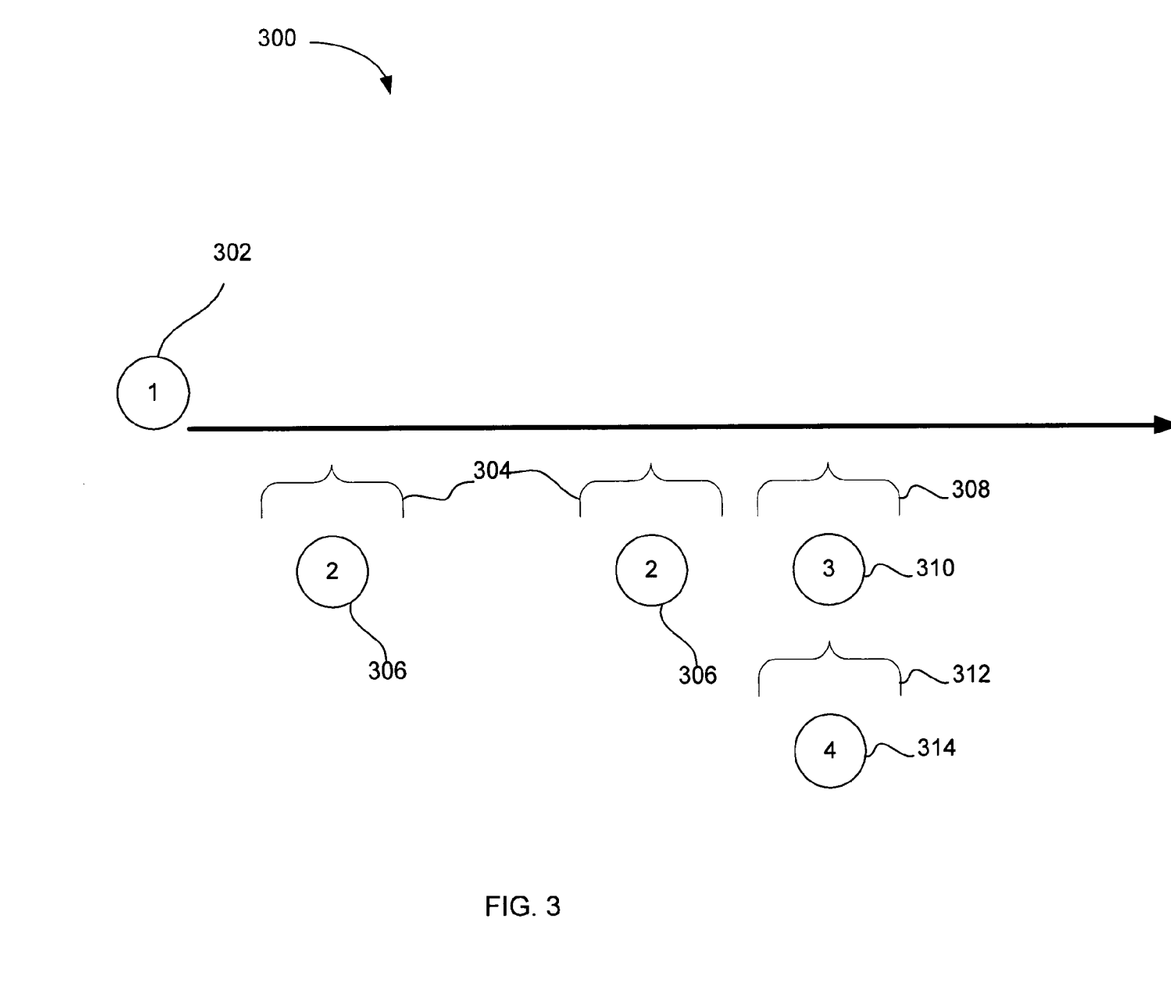
FIG. 3 illustrates a timeline of a media presentation according to an embodiment.

FIG. 3 illustrates a timeline 300 of a media presentation according to an embodiment. The timeline 300 demonstrates the placement and substitution of time-based portions of media tracks within a media presentation. The timeline 300 represents a time-based media presentation which can be played (e.g., viewed or listened to) using a key 302. The key 302 (and other keys shown in FIG. 3) may be, for example, one of the keys 110a-110l or 112a-112f, shown above. Other time-based portions may be added or substituted according to the rights of the user viewing the media presentation. The timeline 300 is a visual representation of the sequence of scenes within a time-based media presentation. Scenes may also be added to an area within the timeline based on rights assigned to or owned by a user (e.g., a viewer). According to an embodiment, the timeline 300 may be used to illustrate the playing of a media presentation using a multi-dimensional rights scheme such as a scheme using the matrix 100. The timeline 300 may be used to illustrate, for example, that the possession of certain keys (i.e., of certain rights) may cause the media presentation to play back in different ways.

For example, a user may make payment to a distributor of the media presentation to skip commercials within the media presentation. Commercials 304 may be added into the media presentation at designated time points, and may be skipped when a key 306 granting a right to the user is present. If the user does not have the rights granted by the key 306 (e.g., the user received the media presentation for free), the commercials 304 are played. As is shown here, a key may be used multiple times throughout the playing of the media presentation.

Additionally, the media presentation may include alternative segments. For example, a time-based portion 308 including objectionable material, and another time-based portion 310 that has been edited may be included in the media presentation. According to an embodiment, the time-based portion 308 is played if the user has a right granted by a key 312. For example, an adult (e.g., a parent) may choose which displays are granted the right by assigning the key 312 to specific displays. The time-based portion 310 is played if the user has a right granted by the key 314. The adult may assign the key 314 to a display used by children, for example. Various other configurations of the timeline 300 may also be used with various media presentations. For example, in some configurations a user may view a time-based portion without any key (i.e., the time-based portion is unencrypted).

Figure 4:
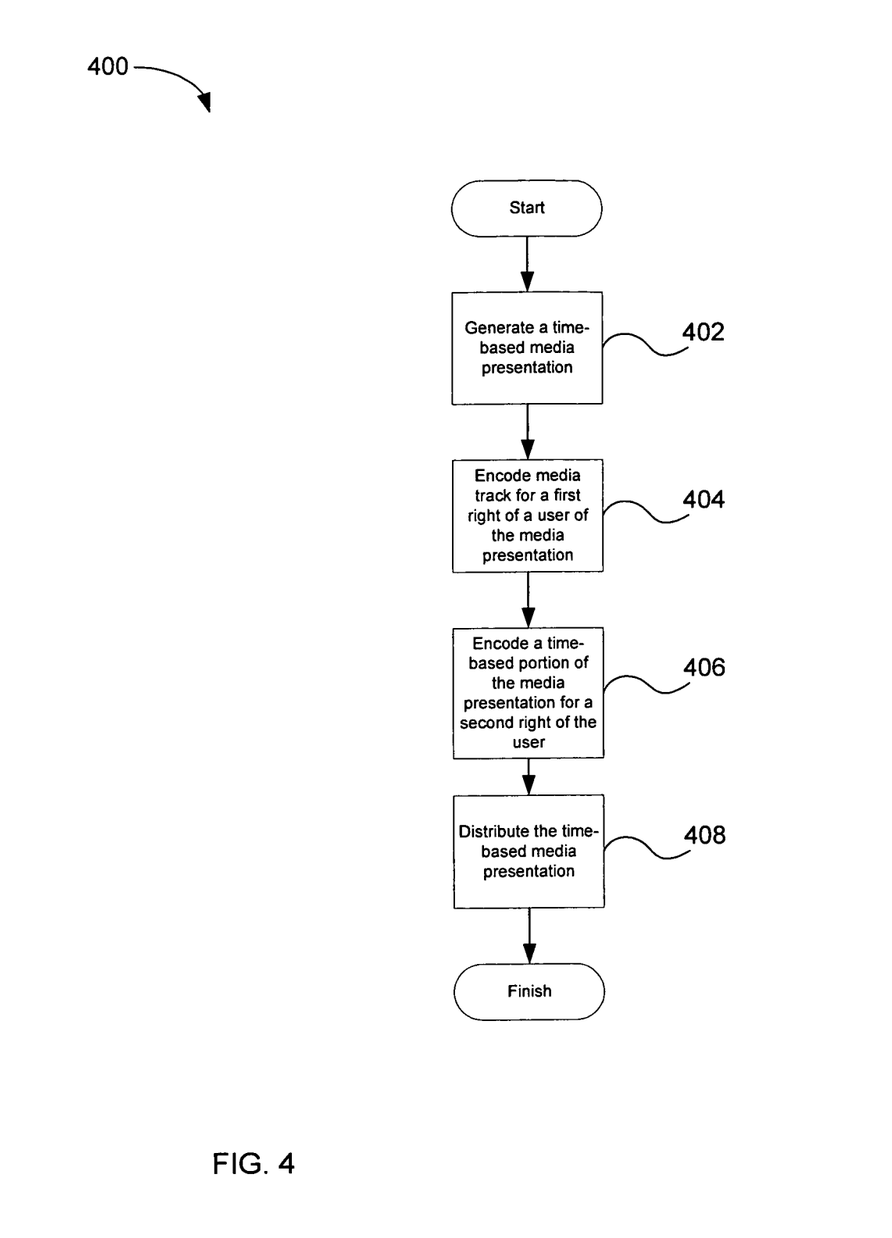
FIG. 4 is a flowchart describing a process for generating and distributing a media presentation with multi-dimensional rights according to various embodiments.
Figure 5:
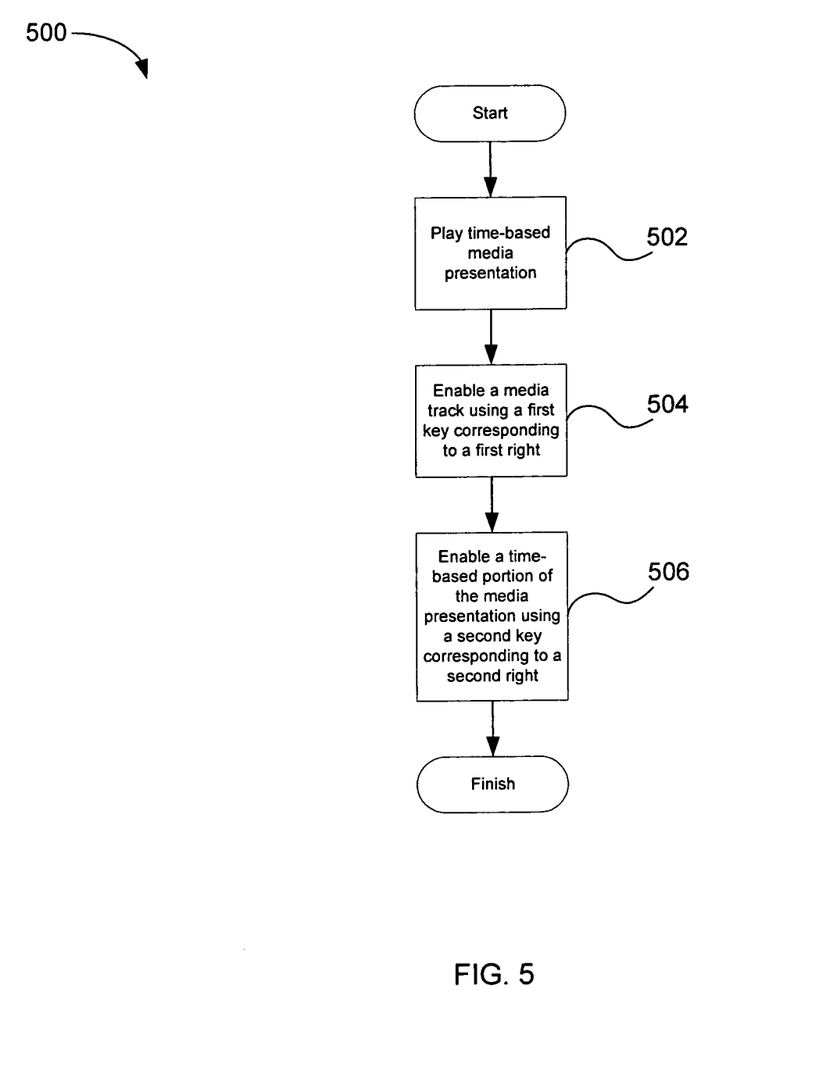
FIG. 5 is a flowchart describing a process for playing a time-based media presentation according to various embodiments.

Process for Generating a Media Presentation Including a Multi-Dimensional Rights Scheme FIG. 4 is a flowchart describing a process 400 for generating and distributing a media presentation with multi-dimensional rights according to various embodiments. The process 400 describes generating and encoding a media presentation, and distributing the media presentation to a user. FIG. 5 includes a flowchart describing use of the media presentation by a user.

In block 402, a time-based media presentation including a media track is generated. The time-based media presentation may be, for example, a video or audio presentation that includes one or more media tracks (e.g., the media tracks 102a-102l). The media track may include one or more audio, video, or other type of media track (e.g., text, still image). Generating may include creating a file or other storage medium, such as a compact disc, to contain the media presentation. Generating may include creating a distributable copy of the media presentation from existing material.

In block 404, the media track is encoded for a first right of a user of the media presentation. The first right to the track may be granted to the user depending on the access to the media track that the distributor or other party wishes to grant. For example, the media track may be a monaural audio track which is free for the user to access. The user may be given a key which unlocks the right for the monaural audio track. Alternatively, the media track may be another type of audio track or a video track. The right may also be granted by a user or party other than the distributor. For example, the user may be a parent of another view who would like to hear an edited audio track rather than the default audio track. This right can be granted by the user.

Encoding the media track for a first right may include creating a matrix such as the matrix 100. The matrix may have rows corresponding to media tracks and columns corresponding to time-based portions of the media presentation, as described above. The time-based media presentation may then be encoded with at least one key using the matrix 100. For example, one or more of the keys 110a-110l or 112a-112f may be used to grant certain rights to a user of the media presentation.

In block 406, a time-based portion of the media presentation is encoded for a second right of the user. The second right may be granted using the same key or a different key from the one used to grant the first right. As discussed above, a media presentation may be divided into one or more time-based portions. Each time-based portion may have a different right associated with it. For example, a time-based portion may be a commercial, which a user with a certain right can skip. This right may be granted to the user in exchange for payment. Alternatively, the time-based portion may be a portion that a parent or guardian does not want their child to watch. The right may be to watch an alternative time-based portion or to skip the time-based portion of the media track altogether.

In block 408, the time-based media presentation is distributed to the user using a network. The time-based presentation may be, for example, a multi-media file (e.g., a streaming video) that is transmitted to the user using the Internet or other network. It is understood, however, that other types of distribution, such as physical media (e.g., compact disc, a DVD) may also be used. The operation of the block 408 may be performed using a system such as the system 200, for example.

Process for Viewing a Media Presentation Encoded Using a Multi-Dimensional Rights Scheme FIG. 5 is a flowchart describing a process 500 for playing a time-based media presentation according to various embodiments. The process 500 generally describes receiving a media presentation and viewing the presentation from a user's end. For example, the user may be a viewer who has received the media presentation as a file over a network.

In block 502, a time-based media presentation including a media track is played. The time-based media presentation may be displayed using a computer system or television, for example, or played using an audio device such as a stereo system. The time-based media presentation may include one or more media tracks, such as video tracks and audio tracks like the media tracks 102a-102l. According to an embodiment, the time-based media presentation may be represented by a matrix such as the matrix 100.

The first right may be determined, for example, based on an ability of a viewing device for the media track or an allowed content level for the viewing device. For example, the viewing device may be a high definition television that can view a high definition video track. The first right may be based on the ability of this device. Alternatively, a viewer of the viewing device may be a child, who may be unable to view certain content. In this case, the first right may be determined based on the appropriate content level for the viewer.

In block 504, the media track is enabled using a first key corresponding to a first right. The key may allow a certain class of users to view a certain media track. For example, the key may allow a user to view a track for which they have made a payment (e.g., a high resolution video track), or another key may be given to a user who has received the media presentation without payment (e.g., to view a low-resolution video track). Additionally, the second right may also be based on the allowed content level for a viewing device. For example, a parent may set a content level for a television, and grant a key for viewing on that television that allows edited content to be viewed.

In block 506, a time-based portion of the media presentation is enabled using a second key corresponding to a second right. As discussed above, the key may allow a user to either view or skip a time-based portion of a media presentation. The time-based portion may be a segment of the media presentation such as the time-based portions 104a-104f. The time-based portion may be a commercial, for example, which can be skipped by those having the second key.

Other rights may be granted during playback according to various embodiments. For example, if a viewer possesses (or does not possess) a key, the viewer's ability to navigate (e.g., fast forward or rewind) the media presentation may be restricted.

An Exemplary Computer System

Figure 6:
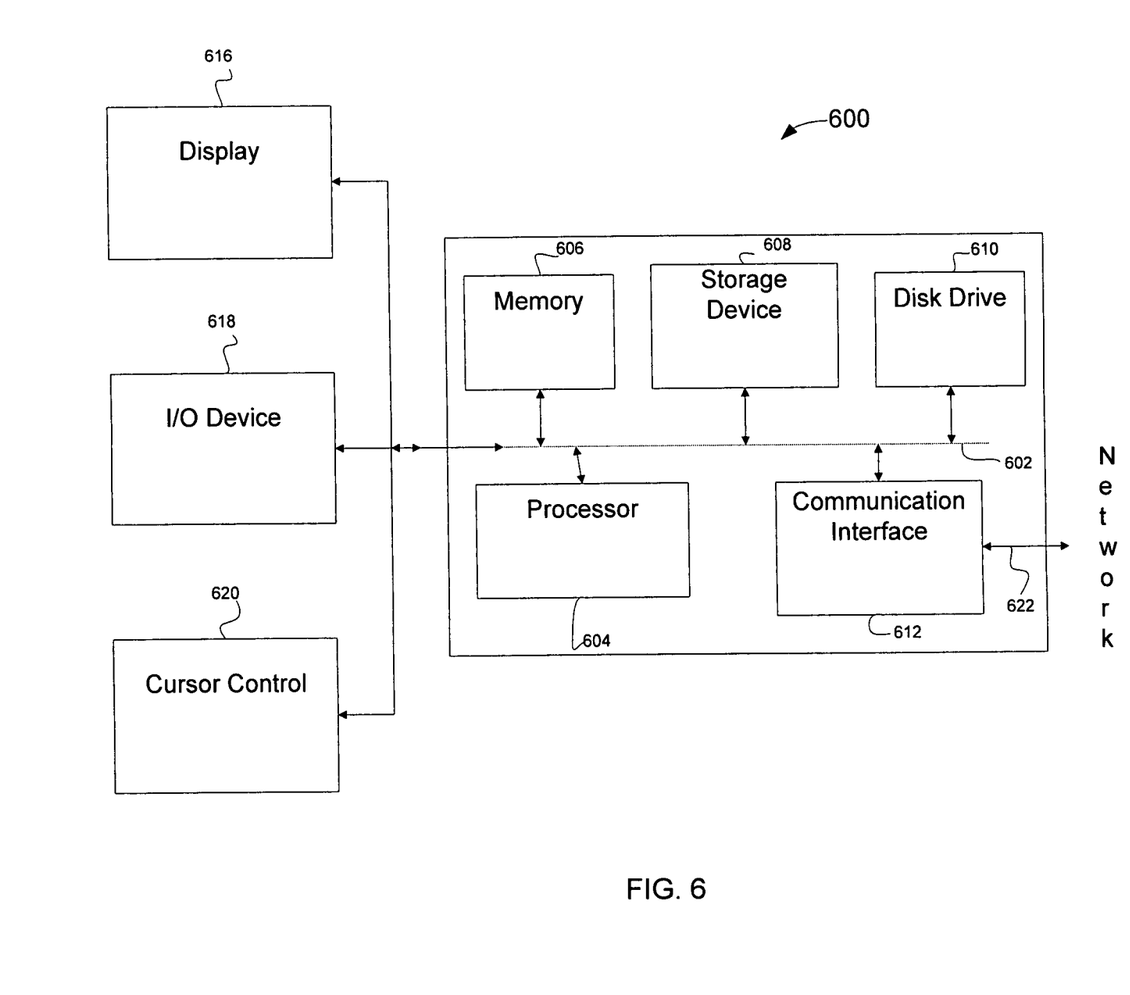
FIG. 6 is a block diagram illustrating an exemplary computer system suitable for enabling a multi-dimensional rights scheme, in accordance with various embodiments.

FIG. 6 is a block diagram illustrating an exemplary computer system suitable for enabling a multi-dimensional rights scheme, in accordance with various embodiments. In some embodiments, a computer system 600 may be used to implement computer programs, applications, methods, processes, or other software to perform the above-described techniques. The computer system 600 includes a bus 602 or other communication mechanism for communicating information, which interconnects subsystems and devices, such as a processor 604, a system memory 606 (e.g., RAM), a storage device 608 (e.g., ROM), a disk drive 610 (e.g., magnetic or optical), a communication interface 612 (e.g., modem or Ethernet card), a display 614 (e.g., CRT or LCD), an input device 616 (e.g., keyboard), and a cursor control 618 (e.g., mouse or trackball).

According to some embodiments, the computer system 600 performs specific operations by processor 604 executing one or more sequences of one or more instructions stored in the system memory 606. Such instructions may be read into the system memory 606 from another computer readable medium, such as the static storage device 608 or the disk drive 610. In some embodiments, hard-wired circuitry may be used in place of or in combination with software instructions to implement various embodiments.

Although the foregoing examples have been described in some detail for purposes of clarity of understanding, the invention is not limited to the details provided. There are many alternative ways of implementing the invention. The disclosed examples are illustrative and not restrictive.

What is claimed:

1. A method, comprising:
   receiving a time-based media presentation for distribution to computing devices associated with users as a single media presentation, wherein the time-based media presentation includes a plurality of media tracks of different types and is divided into a plurality of time-based portions, wherein the plurality of time-based portions divide the plurality of media tracks into predetermined amounts of presentation time;
   creating a matrix having rows corresponding to one of the plurality of media tracks or the plurality of time-based portions and columns corresponding to the other of the plurality of media tracks or the plurality of time-based portions according to a multi-dimensional digital rights management scheme, wherein the rows of the matrix are associated with a plurality of keys of a first dimension of the multi-dimensional digital rights management scheme, and wherein the columns of the matrix are associated with a plurality of keys of a second dimension of the multi-dimensional digital rights management scheme;
   encoding the plurality of media tracks of the media presentation according to the first dimension of a multi-dimensional digital rights management scheme; and
   encoding the plurality of time-based portions of the media presentation according to the second dimension of the multi-dimensional digital rights management scheme,
   wherein the multi-dimensional digital rights management scheme provides rights to present different combinations of the plurality of media tracks and the plurality of time-based portions of the time-based media presentation based on the first dimension and the second dimension.

2. The method of claim 1, further comprising distributing the time-based media presentation to one of the users using a network.

3. The method of claim 1, wherein said encoding the plurality of time-based portions of the media presentation according to the multidimensional digital rights management scheme comprises:
   creating a rights combination for the media presentation to force presentation of a particular one of the time-based portions for one of the users; and
   creating another rights combination to allow the same particular time-based portion to be skipped during presentation for another one of the users.

4. The method of claim 3, further comprising:
   granting said another rights combination to the another user in response to a predetermined condition.

5. The method of claim 4, wherein the predetermined condition is a user payment.

6. The method of claim 1, wherein the plurality of media tracks of the media presentation comprise media tracks having different display resolutions; and
   wherein said encoding the plurality media tracks comprises creating a rights combination for a particular display resolution.

7. The method of claim 1, wherein the first dimension comprises a first set of keys, wherein the second dimension comprises a second set of keys, wherein a first combination of keys from the first set of keys provides a first right to present one or more media tracks from the plurality of media tracks across the plurality of time-based portions, wherein a second combination of keys from the second set of keys provides a second right to present one or more time-based portions from the plurality of time-based portions across the plurality of media tracks, and wherein a third combination of keys from the first set of keys and the second set of keys provides a third right to present one or more media tracks from the plurality of media tracks across one or more time-based portions from the plurality of time-based portions.

8. A method, comprising:
  playing a time-based media presentation configured for distribution as a single media presentation, wherein the time-based media presentation includes a plurality of media tracks and is divided into a plurality of time-based portions, wherein the plurality of time-based portions divide the plurality of media tracks into predetermined amounts of presentation time, wherein said playing comprises:
    accessing a matrix having rows corresponding to one of the plurality of media tracks or the plurality of time-based portions and columns corresponding to the other of the plurality of media tracks or the plurality of time-based portions according to a multi-dimensional digital rights management scheme, wherein the rows of the matrix are associated with a plurality of keys of a first dimension of the multi-dimensional digital rights management scheme, and wherein the columns of the matrix are associated with a plurality of keys of a second dimension of the multi-dimensional digital rights management scheme;
    enabling for a particular user one or more of the plurality of media tracks according to the first dimension of a multi-dimensional digital rights management scheme; and
    enabling for the particular user one or more of the plurality of time-based portions of the media presentation according to the second dimension of the multi-dimensional digital rights management scheme,
    wherein one or more media tracks or one or more time-based portions not enabled for the particular user according to the multi-dimensional digital rights management scheme are not played for the particular user, and
    wherein the multi-dimensional digital rights management scheme provides rights to enable different combinations of the plurality of media tracks and the plurality of time-based portions of the time-based media presentation based on the first dimension and the second dimension.

9. The method of claim 8, wherein the playing comprises receiving the time-based media presentation over a network.

10. The method of claim 8, wherein the plurality of media tracks includes at least one video track and at least one audio track.

11. The method of claim 8, further comprising:
  determining the one or more of the plurality of media tracks to enable for the particular user based on at least one of an ability of a viewing device for the media track and an allowed content level for the viewing device.

12. The method of claim 11, further comprising:
  determining the one or more of the plurality of time-based portions to enable for the particular user based on at least one of the allowed content level for the viewing device and a viewer payment for the media presentation.

13. The method of claim 8, wherein enabling the one or more of the plurality of time-based portions comprises enabling a commercial.

14. The method of claim 8, further comprising restricting navigating of the one or more of the plurality of media tracks according to the multidimensional digital rights management scheme.

15. A method, comprising:
  receiving a time-based media presentation including a plurality of media tracks and divided into a plurality of time-based portions, wherein the plurality of time-based portions divide the plurality of media tracks into predetermined amounts of presentation time;
  creating a matrix having rows corresponding to one of the plurality of media tracks or the plurality of time-based portions and columns corresponding to the other of the plurality of media tracks or the plurality of time-based portions according to a multi-dimensional digital rights management scheme, wherein the rows of the matrix are associated with a plurality of keys of a first dimension of the multi-dimensional digital rights management scheme, and wherein the columns of the matrix are associated with a plurality of keys of a second dimension of the multi-dimensional digital rights management scheme; and
  encoding the time-based media presentation with at least one key from the plurality of keys of the multi-dimensional digital rights management scheme using the matrix,
  wherein the multi-dimensional digital rights management scheme provides rights to present different combinations of the plurality of media tracks and the plurality of time-based portions of the time-based media presentation based on corresponding keys from the plurality of keys of the multi-dimensional digital rights management scheme.

16. The method of claim 15, further comprising granting a key to one of the users in exchange for payment.

17. The method of claim 15, further comprising distributing the time-based media presentation to one of the users using a network.

18. A system, comprising:
  a memory that stores computer-executable instructions; and
  a processor configured to access the memory and to execute the computer-executable instructions to at least:
    store a time-based media presentation configured for distribution to computing devices of users as a single media presentation, wherein the time-based media presentation includes a plurality of media tracks and is divided into a plurality of time-based portions, wherein the plurality of time-based portions divide the plurality of media tracks into predetermined amounts of presentation time;
    create a matrix having rows corresponding to one of the plurality of media tracks or the plurality of time-based portions and columns corresponding to the other of the plurality of media tracks or the plurality of time-based portions according to a multi-dimensional digital rights management scheme, wherein the rows of the matrix are associated with a plurality of keys of a first dimension of the multi-dimensional digital rights management scheme, and wherein the columns of the matrix are associated with a plurality of keys of a second dimension of the multi-dimensional digital rights management scheme;

encode the plurality of media tracks are encoded according to the first dimension of a multi-dimensional digital rights management scheme; and encode the plurality of time-based portions according to the second dimension of the multi-dimensional digital rights management scheme, wherein the multi-dimensional digital rights management scheme provides rights to access different combinations of the plurality of media tracks and the plurality time-based portions based on the first dimension and the second dimension.

19. The system of claim 18, wherein the processor is further configured to at least:

transmit the time-based media presentation to a playback device in data communication with the server to play the time-based media presentation for a particular user, wherein the transmission causes the playback device not to play one or more of the plurality of media tracks or one or more of the plurality of time-based portions not enabled for the particular user according to the multi-dimensional digital rights management scheme for the particular user, and wherein the playback device is one of a television, a personal computer, or a portable device.

20. The system of claim 19, wherein the processor is further configured to at least:

transmit the time-based media presentation to a second playback device in data communication with the server, wherein the transmission causes the second playback device to play the time-based media presentation for another user according to the multi-dimensional digital rights management scheme, and wherein the transmission causes the second playback device to play a different combination of the media tracks and time-based portions for the another user than said first playback device plays for said particular user.

21. A computer program product embodied in a non-transitory computer readable medium and comprising computer instructions for:

receiving a time-based media presentation including a plurality of media tracks and divided into a plurality of time-based portions, wherein the plurality of time-based portions divide the plurality of media tracks into predetermined amounts of presentation time;

creating a matrix having rows corresponding to one of the plurality of media tracks or the plurality of time-based portions and columns corresponding to the other of the plurality of media tracks or the plurality of time-based portions according to a multi-dimensional digital rights management scheme, wherein the rows of the matrix are associated with a plurality of keys of a first dimension of the multi-dimensional digital rights management scheme, and wherein the columns of the matrix are associated with a plurality of keys of a second dimension of the multi-dimensional digital rights management scheme;

encoding the plurality of media tracks of the media presentation according to the first dimension of a multi-dimensional digital rights management scheme; and encoding the plurality of time-based portions of the media presentation according to the second dimension of the multi-dimensional digital rights management scheme;

wherein the multi-dimensional digital rights management scheme provides rights to access different combinations of the plurality of media tracks and the plurality of time-based portions of the time-based media presentation based on the first dimension and the second dimension.

22. The computer program product of claim 21, further comprising computer instructions for distributing the time-based media presentation to one of the users using a network.

23. The computer program product of claim 21, wherein the plurality of media tracks comprise at least one video track and at least one audio track.

24. The computer program product of claim 21, wherein said encoding the plurality of time-based portions of the media presentation according to the multi-dimensional digital rights management scheme comprises:

creating a rights combination for the media presentation to force presentation of a particular one of the time-based portions for one of the users; and creating another rights combination to allow the same particular time-based portion to be skipped during presentation for another one of the users.

\* \* \* \* \*